United States Patent Office 2,878,138
Patented Mar. 17, 1959

2,878,138
METHOD OF BRIGHTENING MATERIAL

Roderich Raue, Leverkusen, Werner Müller, Koln, Josef Link, Leverkusen, Otto Weber, Opladen, and Volkmar Weber, Leverkusen, Germany, assignors to Farbenfabriken Bayer Aktiengesellschaft, Leverkusen, Germany, a corporation of Germany No Drawing. Application September 26, 1956
Serial No. 612,102

Claims priority, application Germany September 28, 1955

8 Claims. (Cl. 117—33.5)

The present invention relates to brightening agents; more particularly it concerns a method of brightening materials of various kind with colourless or nearly colourless fluorescent benzocoumarin compounds. Whilst the water-soluble benzocoumarin compounds are chiefly suitable for the brightening of animal or vegetable fibres, it is surprising that the water-insoluble or barely water-soluble benzocoumarin compounds can especially well be used for the brightening of materials of synthetic polycondensates such as polyesters, polyamides or polyurethanes as well as for the brightening of materials of polyacrylonitrile or cellulose esters.

It has further been found that as brightening agents there may preferably be considered those benzocoumarin compounds which correspond to the general formulas

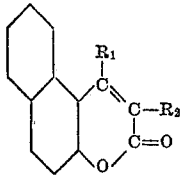

or

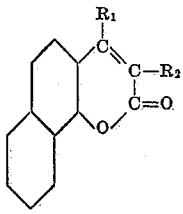

wherein $R_1$ stands for hydrogen or an alkyl radical and $R_2$ denotes hydrogen, an alkyl or aryl group, an acyl group, a carboxyl group which may also be esterified, a carbonamide group which may be substituted by alkyl, aryl or aralkyl radicals, as well as the cyano group; the aromatic rings of the aforesaid general formulas as well as the aromatic ring possibly contained in $R_2$ may carry one or more substituents such as a hydroxyl group, an alkoxy group, an alkyl, aryl or aralkyl group, halogen, a nitro or cyano group, a sulfonic acid or sulfonamide group, a carboxyl group which may also be esterified, a carbonamide group which may be substituted by alkyl, aryl or aralkyl radicals and, finally, an amino group which may also be substituted by alkyl, aryl or arylkyl radicals, possibly sulfonated.

The preparation of benzocoumarin compounds of the aforesaid kind can be effected by various known processes; it is possible to react for example hydroxy-naphthaldehydes with carboxylic acids or their esters which contain a reactive methylene group adjacent to the carboxyl group; suitable hydroxy-naphthaldehydes are for example 2-hydroxy-1-naphthaldehyde, 1-hydroxy-2-naphthaldehyde, 1-hydroxy-4-methoxy-2-naphthaldehyde, 1-hydroxy-4-chloro-2-naphthaldehyde or 1-hydroxy-4-bromo-2-naphthaldehyde; as suitable carboxylic acids there may be mentioned malonic acid, cyanacetic acid and acetoacetic acid.

The brightening agents of the present invention can be applied in known manner, either in the form of solutions in water or in organic solvents, or in the form of dispersions; they can also be applied along with detergents; moreover, the proposed brightening agents can also be added to spinning masses. The required amounts can easily be ascertained in each case by preliminary tests; they generally lie between 0.001 and 0.3 percent, referred to the substrate to be brightened.

The following examples serve to illustrate the invention without, however, limiting the scope thereof.

Example 1

Cellulose acetate fibres are treated at 30–70° C. for 20–30 minutes in an aqueous bath, using a liquor-to-goods ratio of 30:1, to which 1 gram per litre of oleyl-alcohol sulfonate and 0.03 gram per litre of 5,6-benzocoumarin-3-carboxylic acid ethylester in the form of a 5 percent alcoholic solution had been added. The cellulose acetate fibres are then rinsed and dried. The material shows an outstanding brightening.

The 5,6-benzocoumarin-3-carboxylic acid ethylester used as brightening agent is obtainable as follows:

34.4 parts by weight of 2-hydroxy-1-naphthaldehyde and 32 parts by weight of malonic acid diethylester are dissolved with heating in 150 parts by volume of alcohol. 3 parts by volume of piperidine are then introduced drop by drop at 40° C., a slight increase in temperature thereby occurring. The reaction mixture is then slowly heated to the boil, boiled for another 2 hours under reflux and cooled. The 5,6-benzocoumarin-3-carboxylic acid ethyl ester crystallizes out in pale yellow needles of melting point 118° C.; the solution of the ester in methanol shows in great dilution an intense blue fluorescence.

Example 2

Polyacrylonitrile fibres are introduced into an aqueous bath, using a liquor-to-goods ratio of 40:1, to which 1 gram per litre of a surface-active paraffin sulfonate and 0.025 gram per litre of the brightening agent mentioned in Example 1 in the form of a 5 percent alcoholic solution had been added. The bath is then heated to the boil within 20–30 minutes and kept at this temperature for 30–60 minutes. Finally, the polyacrylonitrile fibres are rinsed and dried. The fibres are brightened in an outstanding manner.

Example 3

Polyester fibres of terephthalic acid and glycol are treated in a bath, using a liquor-to-goods ratio of 40:1, to which 1 gram per litre of oleyl-alcohol-sulfonate and 0.025 gram per litre of the brightening agent mentioned in Example 1 in the form of a 5 percent alcoholic solution had been added. The bath is then heated to the boil and maintained at this temperature for 30–60 minutes. After rinsing and drying, the polyester fibres exhibit an outstanding brightening. If desired, 2 millilitres per litre of 25 percent ammonia may also be added to the bath.

Example 4

Polyamide fibers of ε-caprolactam are treated at 30–70° C. for 20–30 minutes in a bath using a liquor-to-goods ratio of 30:1, to which 1 gram per litre of oleylalcohol-sulfonate and 33 grams per litre of the aqueous dispersion of the brightening agent indicated in Example 1, described below, had been added. After rinsing and drying the polyamide fibres treated show an outstanding brightening effect. If desired, 40 grams per litre of acetic acid may also be added to the bath.

The dispersion employed may be prepared in the following manner:

1 part by weight of the brightening agent used in Example 1 is ground with 9 parts by weight of the condensation product of formaldehyde and hydroxynaphthalene sulfonic acid, pasted with a little water and then dispersed with 1000 parts by weight of hot water.

*Example 5*

Cellulose acetate fibres are treated at 30–70° C. for 20–30 minutes in a bath, using a liquor-to-goods ratio of 30:1, to which 1 gram per litre of a surface-active paraffin sulfonate and 0.003–0.03 gram of 5,6-benzocoumarin-3-carboxylic acid nitrile in the form of a 5 percent solution in dimethyl formamide had been added. After rinsing and drying, the fibres show a very good light-resisting brightening.

The 5,6-benzocoumarin-3-carboxylic acid nitrile used as a brightening agent may be prepared in the following manner:

137.6 parts by weight of 2-hydroxy-1-naphthaldehyde and 90.4 parts by weight of cyanoacetic acid ethylester are dissolved in 600 parts by volume of alcohol with heating to 40° C. and treated dropwise with 6 parts by volume of piperidine. The reaction mixture, warming up by itself to 65° C., is slowly heated to the boil, boiled under reflux for two hours and then cooled. Thereby, 5,6-benzocoumarin-3-carboxylic acid nitrile separates out as a fine yellow precipitate. The nitrile thus obtained is barely soluble in alcohol and, after re-crystallisation from o-dichloro-benzene, shows a melting point of 290–300° C.

*Example 6*

Polyester fibres of terephthalic acid and glycol are introduced into a bath using a liquor-to-goods ratio of 40:1 to which 30 grams per litre of formic acid, 1 gram per litre of oleylalcohol sulfonate or another acid-resistant dispersing agent, and 0.001–0.005 gram per litre of the brightening agent indicated in Example 5 in the form of a 5 percent solution in dimethyl formamide are added. The bath is then heated to the boil within 20–30 minutes and maintained at boiling temperature for 30–60 minutes. After rinsing and drying the treated fibres exhibit a very good brightening which is also fast to light.

*Example 7*

Polyester fibres of terephthalic acid and glycol are introduced into a neutral bath, using a liquor-to-goods ratio of 40:1, to which 1 gram per litre of oleylalcohol sulfonate and 0.025 gram per litre of 3-acetyl-5,6-benzocoumarin in the form of a 10 percent solution in dioxane has been added. The bath is then heated to the boil within 20–30 minutes and maintained at this temperature for 30–60 minutes. The fibres are thereupon rinsed and dried; they then show a good brightening. If desired, 1 gram per litre of o-phenylphenol may be added to the bath.

The 3-acetyl-5,6-benzocoumarin used as a brightening agent may be prepared in the following manner:

17.2 parts by weight of 2-hydroxyl-1-naphthaldehyde and 13 parts by weight of acetoacetic ester are dissolved in 150 parts by volume of alcohol with heating. After the solution has cooled down a little, 1 part by volume of piperidine is introduced dropwise; the solution is then heated to the boil and boiled under reflux for 2 hours. On cooling of the reaction mixture, 3-acetyl-5,6-benzocoumarin separates out in the form of light yellow crystals; after re-crystallisation from dioxane, the compound has a melting point of 192° C.

*Example 8*

Polyacrylonitrile fibres are introduced into an aqueous bath, using a liquor-to-goods ratio of 40:1, to which 30 grams per litre of concentrated sulphuric acid and 0.025 gram per litre of 5,6-benzocoumarin-3-carboxylic acid in the form of a 20 percent solution in dioxane had been added. The bath is heated to the boil within 20–30 minutes and boiled for 30–60 minutes. The fibres are then rinsed and dried; they show a very good brightening effect.

The 5,6-benzocoumarin-3-carboxylic acid used as a brightening agent may be obtained in the following manner:

15.7 parts by weight of 5,6-benzocoumarin-3-carboxylic acid ethyl ester, prepared according to the instructions of Example 1, are boiled under reflux with 200 parts by volume of a 5 percent sodium hydroxide solution for 2 hours. The reaction solution is filtered off from small impurities and treated with concentrated hydrochloric acid. The 5,6-benzocoumarin-3-carboxylic acid then separates out in the form of a light yellow voluminous precipitate. After re-crystallisation from dioxane, the acid shows a melting point of 232° C.

*Example 9*

Polyester fibres of terephthalic acid and glycol are introduced into a bath, using a liquor-to-goods ratio of 40:1 to which 1 gram per litre of a surface-active paraffin sulfonate, 10 grams per litre of benzoic acid and 0.025 gram per litre of 5,6-benzocoumarin in the form of a 10 percent alcoholic solution had been added. The bath is then heated to the boil within 20–30 minutes and boiled for 30–60 minutes. The fibres are then rinsed and dried; they are brightened in a remarkable manner.

The 5,6-benzocoumarin used as a brightening agent may be prepared in the following manner:

30 parts by weight of 2-hydroxy-1-naphthaldehyde are heated with 30 parts by weight of freshly melted sodium acetate and 100 parts by weight of acetic acid anhydride to 180° C. for 2½ hours. After cooling, the reaction mixture is stirred in 500 parts by volume of water at 40° C. for several hours. The residue is filtered off with suction and re-crystallized from dilute acetic acid. The 5,6-benzocoumarin thus obtained in the form of nearly colourless needles shows a melting point of 118–120° C.

*Example 10*

To a spinning solution of 200 parts by weight of acetyl cellulose and 800 parts by weight of acetone, 0.02–0.2 part by weight of the brightening agent described in Example 1 are added in the form of a 25 percent alcoholic solution and the mixture is spun in usual manner. The fibres thus obtained possess a high degree of whiteness.

An outsanding brightening effect is also obtained by adding the brightening agent to polyester, polyamide, polyurethane or polyacrylonitrile spinning masses.

*Example 11*

Polyester fibres of terephthalic acid and glycol are treated in a bath, using a liquor-to-goods ratio of 40:1, to which 30 grams per litre of formic acid, 1 gram per litre of oleyl-alcohol-sulfonate, and 0.025 gram per litre of 5,6-benzocoumarin-3-carboxylic acid monomethyl amide in the form of a 10 percent solution in dioxan has been added. The bath is then heated to the boil within 20–30 minutes and maintained at this temperature for 30 to 60 minutes. After rinsing and drying the polyester fibres exhibit an outstanding brightening which is fast to light.

We claim:

1. A method of brightening materials which comprises incorporating into the materials to be brightened practically colourless fluorescent 5,6-benzocoumarin compounds.

2. A method of brightening materials according to claim 1 wherein 5,6-benzocoumarin-3-carboxylic acid ethylester is used as brightening agent.

3. A method of brightening materials according to claim 1 wherein 5,6-benzocoumarin-3-carboxylic acid nitrile is used as brightening agent.

4. A method of brightening materials according to claim 1 wherein 5,6-benzocoumarin-3-carboxylic acid monomethylamide is used as brightening agent.

5. Method of brightening materials according to claim 1 wherein the brightening agent is 3-acetyl-5,6-benzocoumarin.

6. Method of brightening materials according to claim 1 wherein the brightening agent is 5,6-benzocoumarin-3-carboxylic acid.

7. Method of brightening materials according to claim 1 wherein the brightening agent is 5,6-benzocoumarin.

8. Method of brightening a synthetic fibre selected from a group consisting of cellulose acetate, nylon, polyacrylonitrile, and polyethylene terephthalate which comprises incorporating into the fibre a benzocoumarin compound which is substituted in the 4-position by a member selected from the group consisting of a hydrogen and alkyl group.

References Cited in the file of this patent
UNITED STATES PATENTS

| | | |
|---|---|---|
| 2,596,107 | Silverman et al. | May 13, 1952 |
| 2,647,132 | Long et al. | July 28, 1953 |
| 2,673,186 | Wheelock et al. | Mar. 23, 1954 |
| 2,702,296 | Sartori | Feb. 15, 1955 |
| 2,776,909 | Basel | Jan. 8, 1957 |

FOREIGN PATENTS

| | | |
|---|---|---|
| 701,150 | Great Britain | Dec. 16, 1953 |